3,438,900
Patented Apr. 15, 1969

3,438,900
FERRIMAGNETIC MATERIAL SUITABLE FOR USE AT FREQUENCIES OF AT LEAST 50 MC./SEC. WITH IMPROVED PROPERTIES
Gerhard Winkler, Hamburg, Germany, assignor to North American Philips Company, Inc., New York, N.Y., a corporation of Delaware
No Drawing. Filed Mar. 3, 1966, Ser. No. 531,360
Claims priority, application Germany, Mar. 25, 1965, P 36,383
Int. Cl. C04b 35/32, 35/28; H01f 1/10
U.S. Cl. 252—62.6    3 Claims

ABSTRACT OF THE DISCLOSURE

A ferrimagnetic material is disclosed which is useful at frequencies of at least 50 mc./sec. This material has a higher resonance frequency, a lower loss factor (tan $\delta$) and a higher quality factor ($\mu'Q = \mu'/\tan \delta$, $\mu'$ being the real initial permeability) than a comparable known material. This material has a composition $$Ba_{3-a-b-c}Sr_aPb_bMe^{II}_{(2-d)}Co^{II}_{(d+e)}Ir^{IV}_eFe^{III}_{(24-2e)}O_{41}$$

(the comparable material has no ($Co^{II}+Ir^{IV}$) pair) where $Me^{II}$ is $Mn^{II}$, $Fe^{II}$, $Ni^{II}$, $Cu^{II}$, Zn, Mg, or the bivalent metal complex $$\frac{Li^I + Fe^{III}}{2}$$

The material has the same crystal structure as the comparable material.

---

The invention relates to a method of producing ferrimagnetic material for high-frequency application (particularly at least 50 mc./s.). Furthermore the invention relates to formed ferrimagnetic bodies consisting of material produced by said method.

From British patent specification 833,053 there is known a class of ferrimagnetic materials consisting of crystals or mixed crystals of compounds of a chemical composition according to the formula:

$$Ba_{(3-a-b-c)} Sr_a Pb_b Ca_c Me^{II}_{(2-d)} Co^{II}_d Fe^{III}_{24} O_{41} \quad (1)$$

wherein $Me^{II}$ is at least one of the bivalent metals of the group comprising $Mn^{II}$, $Fe^{II}$, $Ni^{II}$, $Cu^{II}$, Zn and Mg or the bivalent complex of $$\frac{Li^I + Fe^{III}}{2}$$

while
$0 \leq a \leq 1$
$0 \leq a \leq 0.6$
$0 \leq c \leq 0.3$
and $0 \leq d \leq 2$ said crystals and mixed crystals having a crystal structure, the elementary cell of which in the hexagonal crystal system may be described by a c-axis of about 52.3 A. and an a-axis of about 5.9 A. These materials, which have, as will be seen from said patent specification, useful electromagnetic properties in various respects, may be considered, insofar as $a = b = c \neq 0$ and, moreover, $d = 2$, as having been derived by substitution from the compound of the chemical composition according to the formula:

$$Ba_3Co^{II}_2Fe^{III}_{24}O_{41}$$

which compound is described in British patent specification 839,860.

As far as in the Formula 1 the magnitude $d$ has a value of at least 0.5, the crystals (or mixed crystals) of the present compounds have a negative crystal anisotropy constant $K_1'$ which means that the direction of spontaneous magnetisation is at right angles to the hexagonal crystal axis and hence parallel to the base plane of the crystal. In this case the crystal has a so-called preferential plane of magnetisation, within which plane the direction of magnetisation can be turned much more easily than away from said plane into a direction not lying in said plane. Materials consisting of such crystals are distinguished by a very high resonance frequency, which means that even with very high frequencies, from 50 to 1000 mc./s., they exhibit comparatively high values of the initial permeability and comparatively low electromagnetic losses, so that they are suitable for the manufacture of ferrimagnetic bodies for the concentration of magnetic lines of force.

It has now been found that the electromagnetic properties of the materials just described may be materially improved in that the resonance frequency is further raised, the magnetic loss factor $\tan \delta = \mu''/\mu'$ is further reduced and the quality factor $\mu'.Q = \mu'/\tan \delta$ is further improved (wherein $\mu'$ is the real value of the initial permeability), by replacing in the compounds of the chemical composition according to Formula 1 part of the $Fe^{III}$ ions pairwise by a combination of a $Co^{II}$ ion and an $Ir^{IV}$ ion so that compounds of a chemical composition according to the formula:

$$Ba_{(3-a-b-c)}Sr_aPb_bCa_cMe^{II}_{(2-d)}Co^{II}_{(d+e)}Ir^{IV}_eFe^{III}_{(24-2e)}O_{41} \quad (2)$$

are obtained, wherein the symbols $a$, $b$ and $c$ have the same meaning as in Formula 1, whereas $0.5 \leq d \leq 2$
$0.005 \leq e \leq 0.5$ and preferably $e < 0.1$ The said replacement of pairs of $Fe^{III}$ ions by the combination of a $Co^{II}$ ion and an $Ir^{IV}$ ion in quantities within the limits indicated in Formula 2 does not alter the crystal structure.

The novel ferrite material is produced by methods known per se for the production of ferrimagnetic ferrites by heating, preferably by sintering, a finely divided starting mixture of the relevant metal oxides which may be replaced wholly or partly by compounds being converted into the metal oxides upon heating and/or by previously formed reaction products of two or more of the metal oxides capable of forming a ferrite. If desired, the finely divided starting mixture is first presintered after which the reaction product is ground to fineness and the resultant powder is again sintered; this sequence of operations may, if desired, be repeated once or several times. The presintering temperature and the final sintering temperature are chosen, for example, between about 1000° C. and about 1450° C., preferably between 1200°

C. and 1350° C. The presintering and final sintering processes preferably take place in an oxygen-containing atmosphere, for example air.

For carrying out or facilitating the sintering process sintering agents, for example silicates and/or fluorides may be added. Ferrimagnetic bodies consisting of the materials described may be produced by sintering the starting mixture directly in the desired shape or by grinding to fineness the reaction product of the presintering process and, if desired after the addition of a binder, by molding it in the desired shape, followed either by the final sintering or by the hardening of the binder.

The ferrite material described may, as an alternative, be produced by melting or by causing monocrystals to crystallize from a melt.

The magnetic properties of ferrimagnetic bodies consisting of ferrite materials produced in accordance with the invention may be further improved by orienting, in a preferred embodiment of the invention, the particles of the powdery ferrite material, while they are still movable relatively to each other, in a rotating magnetic field and by agglomerating them, usually by pressing, in the magnetically oriented state, into a coherent entitiy. It is thus ensured that the great majority of crystals is oriented so that their hexogonal basic planes of easy magnetizability (magnetic preferential planes) are parallel to each other and hence parallel to the plane of the rotating magnetic field. This magnetic orientation brings about an increase of both the initial permeability and the quality factor.

From an article of A. Tauber, J. A. Kohn, and R. O. Savage (Journal of Applied Physics, vol. 34, No. 4, volume 2, pages 1265–1267, April 1963) compounds are known having a composition according to one of the formulae:

$$Ba\ Fe^{III}_{12-2x}\ Zn_x\ Ir^{IV}_x\ O_{19}$$

and $$Ba\ Fe^{III}_{12-2x}\ Co^{II}_x\ Ti^{IV}_x\ O_{19}$$

These compounds may be considered as being derived from the compound $$Ba\ Fe^{III}_{12}\ O_{19}$$

by replacing pairwise part of the trivalent iron ions by the combination of either a zinc ion and an iridium ion or of a cobalt ion and a titanium ion. It was found that these compounds had a strong planar anistropy. At the end of the articles the authors propose to investigate the properties of the system of substances of the composition according to the formula $$Ba\ Fe^{III}_{12-2x}\ Co^{II}_x\ Ir^{IV}_x\ O_{19}$$

which system may be considered derived from the compound $$Ba\ Fe^{III}_{12}\ O_{19}$$

by replacing trivalent iron ions pairwise by the combination of a cobalt ion and an iridium ion. A similar substitution is effected in connection with the present invention, but substitution is performed in compounds having the composition according to the Formula 1, which is much different from the composition according to the formula $$Ba\ Fe^{III}_{12}\ O_{19}$$

It could not be foreseen that by the aforesaid replacement according to the invention of trivalent iron by the combination $$(Co^{II}+Ir^{IV})$$

in a system of substances having a composition differing considerably from the compound $$Ba\ Fe^{III}_{12}\ O_{19}$$

materials could be obtained, which had materially improved electromagnetic properties at frequencies between 50 and 1000 mc./s, The invention will be elucidated with reference to a few examples.

Example 1

A mixture of iron oxide, $Fe_2O_3$, barium carbonate, $BaCO_3$, cobalt carbonate, $CoCO_3$, and iridium dioxide, $IrO_2$, of such a composition that the quantities of the metals have the same ratio as in the compound having the composition according to the formula $$Ba_3Co^{II}_{2.01}\ Ir^{IV}_{0.01}\ Fe^{III}_{23.98}\ O_{41}$$

was ground with alcohol in a ball mill for 15 hours. The solid substance was then filtered off and dried and subsequently presintered in air at 1300° C. twice for one hour, the substance having been again ground in the interval between the two presintering processes. After the second presintering process grinding was resumed again for 15 hours, after which the resultant powder was pressed into a formed body which was sintered at 1250° C. in pure oxygen for 15 minutes. The high-frequency properties of the sintered body, expressed in terms of numerical data, are given in Table I under No. 2. By way of comparison this Table I indicates under No. 1 the optimum values hitherto attained for the corresponding properties of the known isotropic compound:

$$Ba_3\ Co^{II}_2\ Fe^{III}_{24}\ O_{41}$$

Example 2

A mixture of iron oxide, $Fe_2O_3$, barium carbonate, $BaCO_3$, cobalt carbonate, $CoCO_3$, and iridium dioxide, $IrO_2$, of such a composition that the quantities of the metals have the same ratio as in the compound: of the composition according to the formula $$Ba_3\ Co^{II}_{2.075}\ Ir^{IV}_{0.075}\ Fe^{III}_{23.850}\ O_{41}$$

was ground in a ball mill with alcohol for 15 hours. The solid substance was then filtered off and dried and subsequently presintered twice in air at 1300° C. for one hour, while grinding was resumed in the interval between the two presintering processes. After the second presintering process grinding was resumed for 15 hours and the resultant powder pressed into a formed body which sintered in pure oxygen at 1200° C. for 15 minutes. The high-frequency properties of the resultant magnetic isotropic sintered body, expressed in terms of numerical data, are given in Table I under No. 3.

If final grinding is performed in acetone and if the filtered and dried solid powdery substance is compressed in a mold consisting of a non-ferromagnetic steel arranged between the pole pieces of a rotating electromagnet, an anisotropic, formed body is obtained having a radiographically determined degree of orientation (see Lotgering: Journal of Inorganic Nuclear Chemistry 9, 113, 1959), of 0.8 and furthermore having the properties indicated numerically in Table 1 under No. 4.

TABLE I

| No. | | Frequency 800 mc./s | 1,000 mc./s | 1,500 mc./s | 2,000 mc./s |
|---|---|---|---|---|---|
| 1 | $\mu'$ | 15.2 | 12.3 | 5.3 | 2.3 |
|   | $\tan \delta$ | 0.805 | 1.041 | 2.140 | 3.693 |
|   | $\mu'Q$ | 19 | 12 | 2.5 | 0.6 |
| 2 | $\mu'$ | 8.9 | 9.2 | 12.7 | 11.5 |
|   | $\tan \delta$ | 0.34 | 0.038 | 0.213 | 0.650 |
|   | $\mu'Q$ | 264 | 242 | 60 | 18 |
| 3 | $\mu'$ | 4.8 | 5.0 | 5.1 | 5.6 |
|   | $\tan \delta$ | 0.042 | 0.040 | 0.059 | 0.072 |
|   | $\mu'Q$ | 111 | 125 | 87 | 78 |
| 4 | $\mu'$ | 7.0 | 7.2 | 7.3 | 8.4 |
|   | $\tan \delta$ | 0.029 | 0.049 | 0.055 | 0.095 |
|   | $\mu'Q$ | 245 | 150 | 133 | 88 |

Example 3

A mixture of iron oxide, $Fe_2O_3$, barium carbonate, $BaCO_3$, cobalt carbonate, $CoCO_3$, zinc oxide, $ZnO$, and iridium dioxide, $IrO_2$, having such a composition that the quantities of the metals have the same ratio as in the compound having the composition according to the formula:

$$Ba_3Co^{II}_{1.75}Zn_{0.25}Ir^{IV}_{0.10}Fe^{III}_{23.80}O_{41}$$

was processed to yield ferrimagnetic bodies, in the manner described in Example 2. The high-frequency properties of the resultant magnetically isotropic body and of the resultant magnetic anisotropic body (degree of orientation=0.85) are indicated in Table II under No 6 and No 7 respectively in terms of numerical data and the corresponding values of the non-substituted isotropic compound $$Ba_3Co_{1.65}Zn_{0.35}Fe_{24}O_{41}$$

are indicated in this Table II under No. 5.

TABLE II

| No. | Frequency | 100 mc./s | 300 mc./s | 500 mc./s |
|---|---|---|---|---|
| 5 | $\mu'$ | 12.0 | 12.4 | 11.0 |
|  | tan $\delta$ | 0.100 | 0.194 | 0.464 |
|  | $\mu'Q$ | 120 | 67 | 24 |
| 6 | $\mu'$ | 13.5 | 14.7 | 15.4 |
|  | tan $\delta$ | 0.067 | 0.123 | 0.169 |
|  | $\mu'Q$ | 202 | 120 | 91 |
| 7 | $\mu'$ | 21.8 | 20.8 | 23.3 |
|  | tan $\delta$ | 0.083 | 0.110 | 0.193 |
|  | $\mu'Q$ | 264 | 188 | 120 |

What is claimed is:

1. A ferrimagnetic material suitable for use at frequencies of at least 50 mc./sec. consisting essentially of crystals having a composition:

$$Ba_{(3-a-b-c)}Sr_aPb_bCa_cMe^{II}_{(2-d)}Co^{II}_{(d+e)}Ir^{IV}_eFe^{III}_{(24-2e)}O_{41}$$

wherein $Me^{II}$ is at least one bivalent metal ion selected from the group consisting of $Mn^{II}$, $Fe^{II}$, $Ni^{II}$, $Cu^{II}$, $Zn^{II}$, $Mg^{II}$ and the bivalent metal complex $$\frac{Li^I + Fe^{III}}{2}$$

and $$0 \leq a \leq 1$$
$$0 \leq b \leq 0.6$$
$$0 \leq c \leq 0.3$$
$$0.5 \leq d \leq 2$$
$$0.005 \leq e \leq 0.5$$

said crystals having a structure the elementary cell of which in the hexagonal system has a c-axis of about 52.3 A. and an a-axis of about 5.9 A., said material having substantially a higher resonance frequency, a lower loss factor (tan $\delta$) and a higher quality factor ($\mu'.Q = \mu'.\tan \delta$, where $\mu'$ is the real value of initial permeability) at frequencies up to 1000 mc./sec. and higher than a material of like structure and composition without $Co^{II}$ and $Ir^{IV}$ being substituted for a portion of the $Fe^{III}$.

2. A ferrimagnetic material as claimed in claim 1 in which $e < 0.1$.

3. A ferrimagnetic body consisting of a coherent body of the material as defined in claim 1, the particles of which are magnetically oriented with their hexagonal base planes of easy magnetizability parallel to each other.

References Cited

UNITED STATES PATENTS

| 2,977,312 | 3/1961 | Gorter et al. | 252—62.63 |
| 3,046,227 | 7/1962 | Gorter et al. | 252—62.63 |
| 3,072,575 | 1/1963 | Gorter et al. | 252—62.63 |
| 3,162,603 | 12/1964 | Kohn et al. | 252—62.63 |

TOBIAS E. LEVOW, Primary Examiner.

R. D. EDMONDS, Assistant Examiner.

U.S. Cl. X.R.

252—62.61, 62.62, 62.63, 62.64

UNITED STATES PATENT OFFICE
CERTIFICATE OF CORRECTION

Patent No. 3,438,900                                  April 15, 1969

Gerhard Winkler

It is certified that error appears in the above identified patent and that said Letters Patent are hereby corrected as shown below:

Column 4, TABLE I, third column, line 9 thereof, "111" should read -- 115 --. Column 5, line 3, the formula should appear as shown below:

$$Ba_3 \overset{II}{Co}_{1.75} Zn_{0.35} \overset{IV}{Ir}_{0.10} \overset{III}{Fe}_{23.80} O_{41}$$

same column 5, line 18, the formula should appear as shown below:

$$Ba_3 \overset{II}{Co}_{1.65} Zn_{0.35} \overset{III}{Fe}_{24} O_{41}$$

Signed and sealed this 7th day of April 1970.

(SEAL)
Attest:

EDWARD M. FLETCHER, JR.                      WILLIAM E. SCHUYLER, JR.
Attesting Officer                              Commissioner of Patents